Feb. 11, 1969 K. S. POYNTER 3,426,696
TANDEM PUMP
Filed March 27, 1967
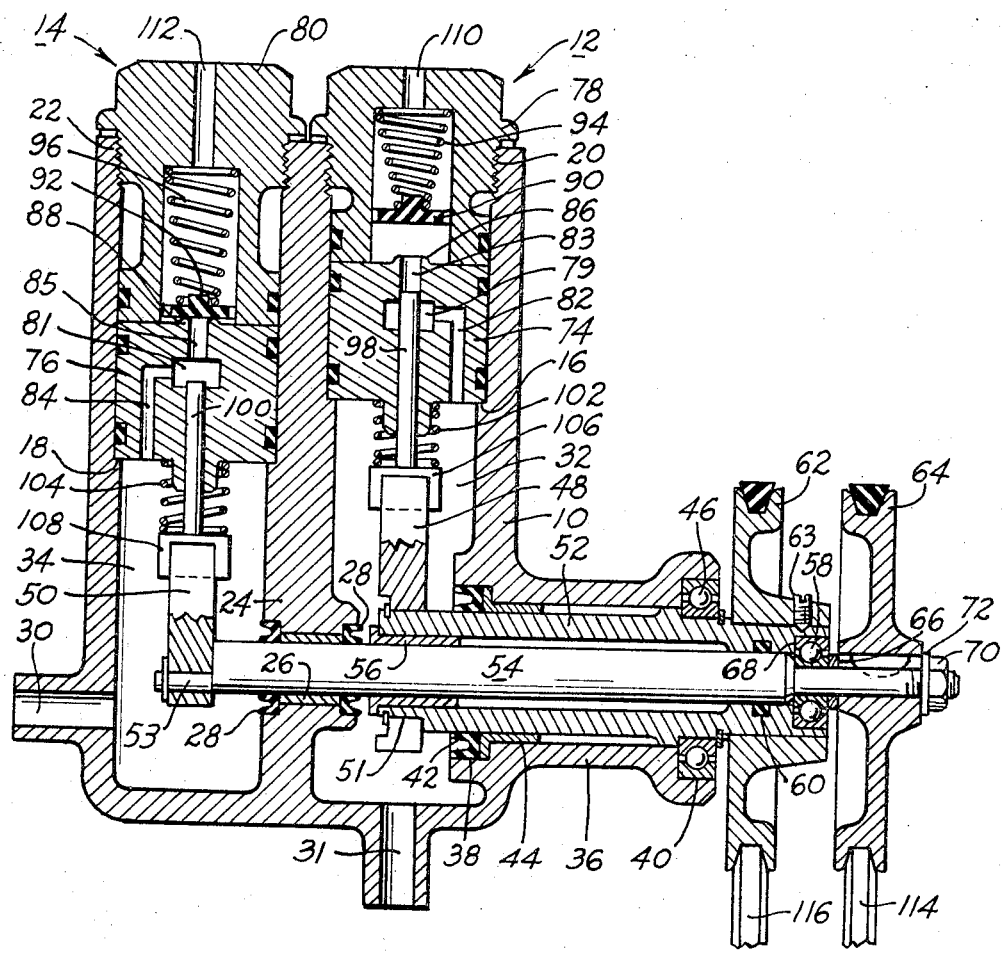
INVENTOR.
KAY STANLEY POYNTER.
BY
*Richard G. Geib*
ATTORNEY.

3,426,696
TANDEM PUMP
Kay Stanley Poynter, South Bend, Ind., assignor to The Bendix Corporation, a corporation of Delaware
Filed Mar. 27, 1967, Ser. No. 626,147
U.S. Cl. 103—169       3 Claims
Int. Cl. F04b 1/02

ABSTRACT OF THE DISCLOSURE

Separate drive means for two pumps in one housing employing coaxial shafts normally rotatable together and adapted to rotate independent of each other.

Summary

In recent years vehicle brake systems have been the target of safety critics and the public has benefited by the incorporation of such features as split hydraulic brake systems and disc brakes. However, improved brake systems have created a need for actuators with a continuous fluid supply.

Many innovators have arrived at the need for a hydraulic power system to meet these needs, but as yet, they have all centered around a single source for the hydraulic pressure.

Some sugggestions have been urged to provide a hydraulic power system which will have a control valve supplying hydraulic pressure to front disc or drum brake actuators, while simultaneonsly acting to push a piston to pressurize rear drum brakes much as is common today for pneumatic servomotors applying master cylinder pistons.

Some suggestions have been observed to employ two pumps for two control valves, and it is in this field that this invention is to be applied.

Prior suggestions employing two pumps have been to the effect of using two housings with separate drive means run by one or more fan belts. This invention combines the pump and separate drive means uniquely in one housing.

Drawing description

The single drawing shows a cross sectional plan view of a pump construction in accordance with the principles of this invention.

Detailed description

There is shown a pump housing 10 formed with a pair of pumping cylinders 12 and 14 which are formed as stepped horizontal bores having shoulders 16 and 18 facing on open end thereof that is threaded as at 20 and 22. The dividing wall 24 between the cylinders 12 and 14 is preferably drilled for the receipt of a sleeve bearing 26, and lip seals 28 to prevent communication between return ports 30 and 31 in the housing. Reservoir chambers 32 and 34 of the pump cylinders 12 and 14 are thus separated so that a failure in one will not remove fluid from the other.

The housing 10 is formed with a boss 36 that is provided with recesses 38 and 40. Within the recess 38 a lip type seal 42 and a sleeve bearing 44 is assembled; whereas a ball bearing 46 is assembled to the recess 40 of the boss 36. If desired, the boss 36 may be formed with an annular flange that would be sealingly mated to the pump housing 10 at a large circular opening therethrough to permit preassembly of eccentrics 48 and 50 with the coaxial shafts 52 and 54, respectively, prior to their insertion within the housing 10. In the construction shown, the connecting links 48 and 50 are assembled to their respective shafts 52 and 54 on the off-set end portions 51 and 53 after the insertion of the shafts into the housing 10. It should also be noted that a sleeve bearing 56 is employed between the shaft 52 and 54 at the left end of the shaft in the drawing and a roller bearing 58 as well as a seal or appropriate packing 60 is employed between the shafts at the right end. A pulley 62 is affixed to shaft 52 by a set screw 63 and pulley 64 is keyed on shaft 54. A spacer 66 is employed between the pulley 64 and the bearing 58 to load the pulley 64 against a shoulder 68 by means of a nut 70 and lock washer 72.

As for the pumping elements within the cylinders 12 and 14 they are comprised of pumping blocks 74 and 76 held against the shoulders 16 and 18 by means of end plugs 78 and 80. The pumping blocks are machined to have passages 82 and 84 connected to the respective reservoir chambers 32 and 34, which passages are open to pump inlet chambers 79 and 81. Discharge passages 83 and 85 lead from the pump inlet chambers 79 and 81 and terminate in raised seat provisions 86 and 88 upon which valves 90 and 92 are urged by springs 94 and 96.

Pumping pistons 98 and 100 are assembled to the pumping blocks 74 and 76 to normally be aligned with the passages 83 and 85. Springs 102 and 104 placed between the pumping blocks and pins 106 and 108 within the connecting links 48 and 50 normally maintain the pumping pistons 98 and 100 in the position whereby the inlet chambers 79 and 81 are open to the passages 82 and 84. This attitude is seen with reference to the pump piston 100 in the pumping blocks 76. Pump piston 98, because of the position of the link 48 is shown in the pressurized attitude whereby it is discharging pressurized fluid about the valve 90 to the discharge port 110 in the plug 78. A discharge port 112 is provided for the plug 80.

In order to operate the pump, a pair of fan belts 114 and 116 connect the pulleys 62 and 64 to the drive shaft on an automobile engine so that as the engine is operating in the automobile, the shafts 52 and 54 are rotating to reciprocate the links 48 and 50 due to an eccentric connection with shafts 52 and 54 to provide fluid pressure at the discharge ports 110 and 112.

During normal operation there is desirably no relative motion between the shafts 52 and 54. However, in the event of a breakage of one or the other of the belts 114 and 116 or a "freeze-up" failure of either section of the pump, or in the event of belt tension inconsistencies, relative motion between the pump shafts 52 and 54 will take place. Thus, a failure of one pump section will not affect the ability of the operating section to continue to pump pressurized fluid.

It should be noted that the pumping cylinders 12 and 14 are preferably arranged so that as one pump is in its suction cycle, the other pump is in its pressure cycle. This will have the advantage of reducing fluid suction and bearing pressure load.

Having fully described an operative construction of the invention, it is now desired to set forth the scope of protection sought by these Letters Patent as follows:

I claim:
1. A drive means for a pump comprising:
   a pump housing having a pair of pumping cylinders separated by a partition and an open ended bore;
   first and second pump means with the first pump means in one cylinder and the second pump means in the other cylinder both in said housing, said first and second pump means having separate fluid inlets and outlets for receiving a low pressure fluid and providing separate high pressure fluid discharges;
   a first shaft revolvably supported in the bore of said housing and connected by a first eccentric to said first pump means;
   a second shaft revolvably within and supported by said first shaft and by said partition of said housing to be coaxial with said first shaft, said second shaft being connected by a second eccentric to said second pump means to operate said second pump means independently of the operation of said first pump means by said first shaft such that upon any failure preventing operation of one of the pump means to discharge pressurized fluid, the other pump means in the same said housing will continue to operate and provide a pressurized fluid discharge; and first and second drive means that are unrelated to each other and respectively connected to said first and second shaft means for operating said pump means independent of each other.

2. A drive means according to claim 1 wherein said first and second pump means are arranged in said housing to have an out of phase relationship whereby pressure loading of said shafts are compensating.

3. A drive means according to claim 1 wherein the operative connection of said first and second pump means to its respective first and second coaxial shafts comprises first and second eccentrics 180° out of phase whereby rotary motion of said shafts is changed to reciprocating motion for pumping.

References Cited

UNITED STATES PATENTS

| 1,508,805 | 9/1924 | Shaw et al. | 230—184 |
| 1,719,693 | 7/1929 | Ernst | 103—161 |
| 2,019,264 | 10/1935 | Koons | 103—207 |

FOREIGN PATENTS

| 857,756 | 4/1940 | France. |
| 1,365,708 | 5/1964 | France. |
| 526,439 | 5/1955 | Italy. |

WILLIAM L. FREEH, *Primary Examiner.*